Figure 1:
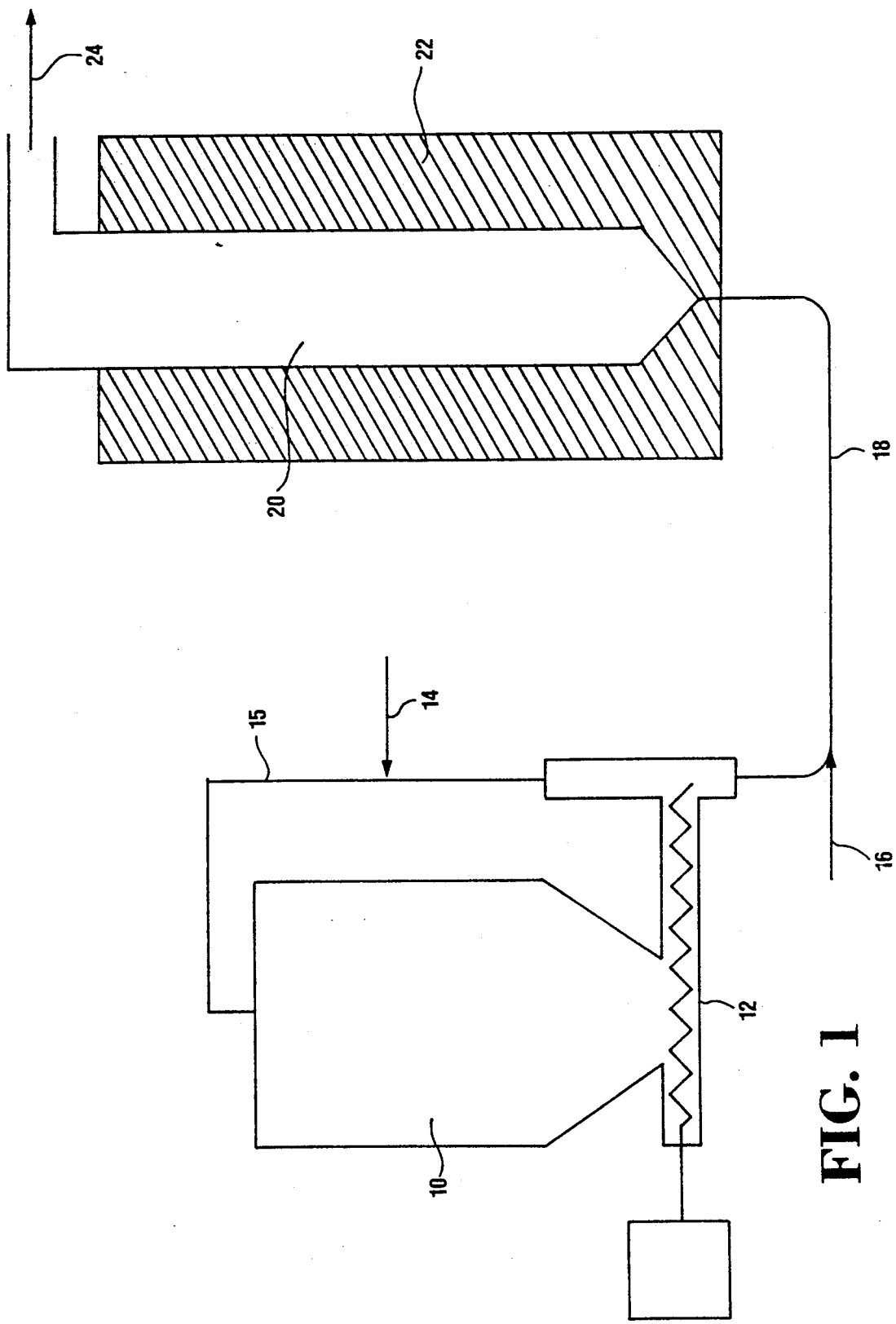

United States Patent [19]

Bonsack

[11] Patent Number: 5,032,372
[45] Date of Patent: Jul. 16, 1991

[54] DILUTE-PHASE CHLORINATION PROCEDURE

[75] Inventor: James P. Bonsack, Aberdeen, Md.

[73] Assignee: SCM Chemicals, Inc., Baltimore, Md.

[21] Appl. No.: 418,101

[22] Filed: Oct. 6, 1989

Related U.S. Application Data

[63] Continuation of Ser. No. 204,012, Jun. 8, 1988, abandoned, which is a continuation-in-part of Ser. No. 34,896, Apr. 3, 1987, abandoned.

[51] Int. Cl.$^5$ .............................................. C01G 23/00
[52] U.S. Cl. ...................................... 423/492; 423/79; 423/78; 423/74; 423/136
[58] Field of Search ............... 423/60, 62, 74, 78, 423/79, 136, 148, 149, 96, 492, 493, 496, DIG. 16; 75/112, 113, 63, 68 A, 85

[56] References Cited

U.S. PATENT DOCUMENTS

| | | | |
|---|---|---|---|
| 2,316,275 | 4/1943 | Muskat et al. | 423/96 |
| 3,495,936 | 2/1970 | Jones, Jr. | 423/79 |
| 3,991,157 | 11/1976 | Adachi et al. | 423/79 |
| 4,014,976 | 3/1977 | Adachi et al. | 423/79 |
| 4,086,084 | 4/1978 | Oliver et al. | 423/96 |
| 4,310,495 | 1/1982 | Bonsack | 423/79 |
| 4,343,775 | 8/1982 | Bonsack | 423/78 |
| 4,440,730 | 4/1984 | Bonsack | 423/62 |
| 4,442,076 | 4/1984 | Bonsack | 423/78 |
| 4,487,747 | 12/1984 | Robinson et al. | 423/60 |
| 4,519,987 | 5/1985 | Robinson | 423/60 |
| 4,619,815 | 10/1986 | Robinson | 423/79 |
| 4,652,434 | 3/1987 | Bonsack et al. | 423/79 |

Primary Examiner—Theodore Morris
Assistant Examiner—Edward Squillante
Attorney, Agent, or Firm—Lieberman, Rudolph & Nowak

[57] ABSTRACT

An improved dilute phase chlorination procedure characterized by providing extremely finely divided oxygen-containing metallic material and a carbonaceous material co-milled together to a particle size size of less than 20 microns. The finely divided charge material is introduced into a tubular reaction zone, preferably at the bottom, with the gaseous chlorination agent where reaction occurs at a temperature above 800° C. for a period of time sufficient to fully react the chlorinating agent in a single pass. Metal chloride is recovered from the tubular reactor and, most advantageously, there is little or no need to separate any dusty unreacted solid material from the off-gases for recycle to the chlorination zone.

5 Claims, 1 Drawing Sheet

DILUTE-PHASE CHLORINATION PROCEDURE

This application is a continuation of U.S. Ser. No. 204,012, filed June 8, 1988 which in turn is a continuation-in-part of U.S. Ser. No. 34,896, filed Apr. 3, 1987, both now abandoned. The contents of U.S. Ser. Nos. 204,012 and 034, 896 are hereby incorporated by reference.

The efficient and economical extraction of metals from metal rich ores is an important industrial process for the production and manufacture of pure metals and metal oxides. Titanium or titanium dioxide pigment, for example, are obtained from various titanium rich ores such as rutile, ilmenite and leucoxene following two conventional processes - the "sulfate" process wherein ilmenite is dissolved in sulfuric acid, ferrous ion in the ore is partially separated as ferrous sulfate by crystallization, and pure hydrous titanium dioxide is precipitated by hydrolysis from the ferroginous titanium sulfate solution; the "chloride" process whereby rutile or mixtures of rutile, ilmenite and leucoxene are mixed with a carbonaceous material such as coke, subsequently chlorinated to volatile titanium tetrachloride which is then purified by distillation, and finally the chloride is either oxidized at high temperatures to produce titanium dioxide or reacted with sodium metal to produce the desired titanium metal. Of the two processes, the chlorine process is becoming more prevalent because of the smaller amounts of environmentally objectionable materials generated as waste products of the process.

Fluid-bed chlorination processes are used commercially in the production of metal chlorides from metal oxide ores. An alternate chlorination process which can be used in the production of metal chlorides from metal-oxide ore feedstocks is a process which may be described as "dilute-phase" chlorination. That is, fine particles of feed ore and carbon, although much coarser than those used in the present invention, are at least partially suspended in a flowing gas stream of the chlorinating agent and moved through a heated reactor where chlorination takes place. The final chlorinated product is recovered downstream of the reactor from the effluent gas generated by the process.

In my prior patent, 4,343,775, I have described a process for the chlorination of titaniferous materials in an entrained flow mode which utilized a special microporous carbon characterized as having a pore diameter of less than 20 Angstroms. This carbon conferred upon the process an improved reaction rate and a better degree of completion of the chlorination reaction, thereby overcoming a principal problem with prior art procedures which required an extremely long reaction chamber or dwell time of the material within the chambers. The reactant materials and the chlorinating gas in this patented process moved co-currently in a downward direction.

In another of my prior patents, U.S. Pat. No. 4,442,076, I described another entrained flow process for obtaining product chlorides of titanium and iron by chlorinating a titaniferous powder with chlorine gas in the presence of fine porous coal based reductant. This basically downflow process was characterized by supplying fine titaniferous and reductant powders to a reaction zone at a rate sufficient for establishing and maintaining titanium, iron and carbon reactants in substantial excess over those amounts stoichiometrically needed for complete reaction of the chlorine present. A major portion of the carbon reductant employed in this process was fresh reactive char having a surface area of at least 10 $m^2$/gram, and a particle size of $-140$ mesh. Unreacted carbon and titaniferous solids were separated from the effluent and at least a major portion of the treated solids was recycled to the process to ensure high degree completion of the chlorination process.

In my prior patented procedures, the feedstock ore is coarse by comparison with those of the present invention wherein the particle sizes are less than 20 microns and preferably between 5 and 10 microns. Longer retention times are required for the coarser particles which, in turn, necessitates lower chlorine velocites resulting in lower production over time. Downflow is preferred, if not required, when larger particle sized ores are used to prevent the larger particles from building up in the reactor. Generally, the larger particles simply fall through the downflow reactors without reacting to any substantial extent. The largest particles of such coarse feedstocks are too large to react in traversing the chlorination zone, but too small to be fluidizable. Therefore, if it were attempted to feed them in an upflow mode, they would build up in the bottom of the reactor where they would sinter and choke off the inlet.

An earlier patent, 3,495,936, also relates to a dilute phase process for chlorinating titaniferous ores as an alternative to a fluid bed reaction. In this process, the reactants were introduced into the bottom of the reactor and flowed in an upward direction. A separation zone to separate unreacted solid particulate materials contained in the off-gases was required so that these solids could be returned to the chlorination zone.

Another patent, 4,014,976, describes a process for the production of titanium tetrachloride by reacting a titaniferous material having a particle size between 106 microns and 38 microns with a chlorinating agent in the presence of a coarse carbonaceous substance in a dilute phase fluidization system. This process is characterized by upwardly directed flow of the reactants through a reactor which gradually increases in diameter from the bottom to the top. Unreacted solid matter is separated from the off-gases and returned to the chlorination zone. The carbonaceous material is described as being coarse and at least 3 times as large as that of the titaniferous material. The amount of solid carbonaceous material in the solids portion is as much as from 70% to 99% by weight.

Another patent, 3,991,157, discusses another upflow process whereby chlorine containing gas is introduced as an upward flow into a vertical, upwardly widening column type reactor, and a titaniferous material and solid carbonaceous reducing agent are charged into the reactor at its upper and lower parts to effect chlorination in a dilute phase fluidization system accompanied by reflux of part of the solid materials to yield titanium tetrachloride. It is characteristic of the process that the charge material is introduced at least two places in the reactor and that the solid charge density in the reaction zone is from 10 to 200 kg/$m^3$, and the particle size, in relation to the size for particles according to the present invention, is very large ($-150$ mesh for the titaniferous material; and $-80$ mesh for the coke).

In prior art upflow "dilute phase" chlorination systems, the particles are much larger, not completely entrained, and require a build-up of solids in the reactor prior to operation. A substantial portion of the large particles that are entrained will leave the chlorination zone incompletely reacted. Cyclone separation with its attendant expense must be used to recover these entrained particles and return them to the chlorination zone. Such "hot" cyclone separators are troublesome to operate and maintain.

The data presented in the following Table illustrate how the present process differs from the prior art upflow "dilute phase" chlorination processes. Note that for the present process, smaller particles are used, there is a lower ore/carbon concentration in the reactor, less carbon is required in the chlorination zone, there are lower entrainment losses, and no hot cyclone separator is required. These are all advantages which were not available in the prior art.

TABLE

Comparison Between Method According to the Present Invention and Prior Art Dilute-Phase Upflow Processes

|  | A | B | C |
|---|---|---|---|
| Cyclone Separator Necessary | No | Yes | Yes |
| Entrainment Losses from Chlorination Zone | Low | High | Very High |
| Requires Build-up of Solids in Reactor | No | Yes | Yes |
| Particle Size (microns) |  |  |  |
| Ore | 1–10 | 38–106 | 75–250 |
| Carbon | 1–10 | 114–318 | 250–850 |
| Ore & Carbon Concentration in chlorination Zone (Kg/m$^3$) | 0.1–1.0 | 10–200 | 65–130 |
| Wt. % Carbon in Solids in Reaction Zone | 15–30 | 70–99 | 40 |

A = method according to the present invention
B = method according to 3,991,157 and 4,014,976
C = method according to 3,495,936

It has now been found that by reducing the particle size of the reactant materials to less than 20 microns, preferably less than 10 microns and most preferred between 5 and 10 microns, and using a dilute phase regime with a higher chlorine velocity, chlorination of various metal oxides can be achieved without any consequential amounts of unreacted solid particulate material in the resulting off-gas. The particle velocity is essentially the same as the gas velocity. The settling rate of these fine particles is very small compared to the chlorine velocity. Using these fine particle feedstocks, the required retention time in the chlorination zone is dramatically reduced. This allows higher chlorine flows, higher velocities through the chlorinator and greater yields. Complete reaction of chlorine can be attained with only a modest excess of ore and carbon over stoichiometric amounts. In the present process, nearly all the entrained ore and carbon will react and, therefore, "hot" cyclones are not necessary for capture and return of unreacted solid feedstocks to the chlorination zone.

Briefly stated, the present invention is a process for the dilute-phase chlorination of a metal oxide in the presence of a carbonaceous reductant. The process is characterized in that the solid reactants are mixed together and undergo size reduction to a mean particle size of from 1 to 20 microns, preferably from 1 to 10 microns, and most preferably from 5 to 10 microns. The resulting solids are introduced into a tubular chlorinator, preferably at the bottom of the chlorinator, along with a chlorine-providing material selected from chlorine gas, organochlorides, or mixtures thereof. The temperature of the reactor, according to the process of the present invention, is maintained between 800° C. and 1500° C., preferably between 900° C. and 1200° C., and most preferably between 1000° and 1100° C. The concentration of the ore oxide and carbonaceous reductant at the inlet of the chlorination zone is from 0.1 to 1.0 kg/m$^3$—a figure well below that needed in the prior dilute-phase upflow chlorination processes, and an additional indication of the efficiency of the present invention. The reactants are maintained in the reactor at reaction temperature for a period of time (dwell time) sufficient to chlorinate the oxidic material and to generate an essentially gaseous off-gas composed of carbon oxides and vaporous metal chlorides. Under normal process parameters, the dwell time may be expected to be between 1 and 15 seconds. Where the oxidic material is titanium oxide, the off-gas contains titanium tetrachloride.

As indicated above, the present invention generally provides a dilute-phase flow process for chlorinating metal oxides, particularly titanium dioxide waste from a fluidized bed chlorination process, to produce metal chlorides without substantial amounts of unreacted solid particulate material in the off-gas. The present process is useful in the recovery of a variety of metals as the chlorides from ores, waste streams or tailings. Examples of metals which can be recovered from ores using the present process are aluminum from bauxite, chromium from chromite; tantalum from tantalite; tin from cassiterite; titanium from rutile, anatase, or ilmenite; tungsten from scheelite or wolframite; silicon from sand, etc.

Waste streams often contain metal values in the form of fine particulates that elude normal processing methods that are designed to capture these elements. An example is a titanium dioxide plant using fluidized bed chlorinators to recover titanium as titanium tetrachloride from +200 mesh titaniferous feedstocks. As much as about 10% of the titanium values in the feedstock will be reduced fine —200 mesh dust which will be discharged from the process as waste. Because of the high cost of titaniferous ores, especially rutile, it is prudent to recover the titanium values in these waste streams. Moreover, the economic and environmental problems associated with the disposal of thousands of tons of this dust at each typical plant may be avoided by use of the present process.

Tailings from mining operations often contain substantial amounts of the very metal the process is supposed to recover. An example is the upgrading of soft rock anatase ore to a quality suitable for a titanium dioxide plant feedstock. Especially in the crushing and sizing steps, a slime tailings stream is produced, which because of the small particle size would not normally have any value. The amount of titanium in this tailing stream can be as high as 40–50% of the titanium mined. Utilizing the process according to the present invention, substantial amounts of the desired metal may be recovered from these normally discarded "wastes".

The invention may be better understood by reference to the annexed drawing which is a diagrammatic and schematic illustration of an apparatus useful in carrying out my invention.

Referring now to the annexed drawing, there is here shown in diagrammatic and schematic form an apparatus useful in carrying out the present invention. Material which has been mixed (oxidic material and solid carbonaceous reductant) and previously ball milled to a predetermined size below 20 microns, is transferred to a gas tight steel hopper 10. The mixture is fed from the hopper 10 by a conventional motor-driven screw feeder 12. The mixture is then blown by nitrogen purge 14 through the line 15 communicating with the exit end of the screw feeder 12, and further moved by the introduction of chlorine-containing gas at 16, e.g., a mixture of chlorine and oxygen. The solids/gas mixture moves through the line 18 into the upflow chlorinator 20. The chlorinator 20 is maintained at e desired reaction temperature by any suitable means, such as an electric heating mantle 22. The off-gas exiting from the top end 24 is cooled by passage through conventional condensers, not shown, to recover the metal chloride products. During test runs, the off-gas was sampled at frequent intervals and analyzed by gas chromatography for $N_2$, CO, $CO_2$, $Cl_2$ and $COCl_2$.

In an experimental embodiment of the apparatus as shown in the drawing, the transfer line 18 was 7 mm internal diameter. The chlorinator 20 was a 70 mm ID quartz tube with 900 mm of its length kept at 1050° C. by the heating mantle 22. Gas volumes (liters) in the following examples are measured at standard conditions of 20° and atmospheric pressure.

EXAMPLE 1

Titanium dioxide dust was recovered from the waste stream of a titanium dioxide plant which was running on the fluidized bed chlorination process. After removal of soluble metal chlorides, carbon dust and gangue, the material was analyzed and found to contain 95.1% by weight $TiO_2$, 2.2% $SiO_2$ and 1.0% $ZrO_2$.

Carbon, as a reductant, was prepared from −4 mesh wood charcoal. The charcoal was heated in hot gases from the combustion of natural gas (about 71 vol % $N_2$, 9% $CO_2$, and 19% water vapor) at 900° C. to reduce the hydrogen content and make it more reactive. The resulting char contained 93 wt. % carbon, 2% ash and 0.7% hydrogen.

Char, 0.239 Kg, was mixed with 1.0 kg of $TiO_2$ dust and the mixture was ball milled using ¾" ceramic balls until the average particle diameter of the mixture was reduced to 5.5 micrometers.

The mixture was entrained in the chlorine-containing gas mixture and fed to the chlorinator 20 at the rate of 16.5 grams/minute along with 6.8 liters/minute of chlorine, 0.45 liters/minute of oxygen, and 1.8 liters/minute of nitrogen. Analyzes of off-gas samples showed that over 99% of the chlorine reacted to produce titanium tetrachloride together with traces of impurity metal chlorides. In this case the residence time was 5 seconds.

EXAMPLE II

Bayer hydrate, $Al(OH)_3$, prepared from bauxite ore was calcined at 400° C. to reduce the combined water content. Brown coal char was dried and then ball milled until the average particle diameter was 5.5 micrometers. Calcined Bayer hydrate, 1.0 kg, containing 90 wt% aluminum oxide was mixed with each 0.37 kg of char, which contained 92% by weight carbon and 2.3% ash. The mixture was fed to the chlorinator 20 in the manner set forth in Example I at the rate of 13.1 grams/minute along with 6.8 liters/minute of $Cl_2$, 0.45 liters per minute of $O_2$ and 1.8 liters/minute of nitrogen. Analysis of off-gas samples showed that 70% of the chlorine reacted to form $AlCl_3$ and HCl (from residual combined moisture in the alumina and brown coal char). The residence time was 5 seconds.

EXAMPLE III

Anatase ore fines, 1.0 kg, containing 66.7 wt % $TiO_2$, 13.0% iron oxide, 12.4% apatite and monazite, and 4.0% aluminosilicates were mixed with each 0.23 kg of wood char. The char was prepared by heating wood charcoal in nitrogen at 900° C. to reduce the hydrogen content. The resulting char contained 94.8 wt % carbon, 1.0% ash, and 0.7% hydrogen. The mixture was ball milled until the average particle diameter of the mixture was reduced to 6.3 micrometers.

The mixture was fed to the chlorinator as above described at the rate of 42.8 grams/minute along with 13.6 liters/minute of $Cl_2$, 3.6 liters/minute of nitrogen, and 0.90 liters/minute of $O_2$. No unreacted chlorine was detected in the off-gas. All the chlorine reacted to produce $TiCl_4$ and chlorides of impurity metal oxides. In this example, the residence time of the reactants was 2.5 seconds.

In the above examples, the retention time of the gas and solids ranged from 2.5 to 5 seconds. At the gas velocities needed to entrain the larger solid particles, the retention time was limited to a maximum of about 5 seconds in the small laboratory scale chlorinator 20. The use of larger chlorinators operating at the same gas velocities would result in longer retention times. The required retention time will depend on the material to be chlorinated. For example, 2.5 seconds is sufficient at 1050° C. for complete reaction of chlorine with titanium ore in Example III. For materials that are more difficult to totally chlorinate, such as alumina in Example II, a retention time greater than 5 seconds is required.

Reactive carbons are beneficially used in the practice of the present invention. The coal char disclosed and claimed in U.S. Pat. No. 4,442,076 could also be used, as illustrated in Example II above. Wood chars are also beneficially used as illustrated in Examples I and III.

It is generally preferred that a small excess of ore and carbon over the stoichiometric amount for reaction with all the chlorine be charged to the chlorination zone. This results in the absence of unreacted chlorine in the off-gas. Alternatively, a small excess of chlorine over the stoichlometric amount to react with all ore and carbon could be used. Although this would result in complete chlorination of ore, there would be unreacted chlorine in the off-gas. This would be troublesome, because after condensation of metal chlorides, the off-gas is normally discharged into the atmosphere.

The present invention is useful for beneficiating or upgrading materials by partial chlorination; that is, chlorination of only the more readily chlorinated components. For example, fine ilmenite ore ($FeO.TiO_2$) can be fed to the chlorinator 20 with only enough chlorine to react with the iron oxide content, leaving $TiO_2$-enriched solids.

From the foregoing description, one skilled in the art can easily ascertain the essential characteristics of any invention and without departing from the spirit and scope thereof, can make various changes and/or modifications to the invention for adapting it to various usages and conditions. Accordingly, such changes and modifications are properly intended to be within the full range of equivalents of the following claims.

Having thus described my invention and the manner and process of making and using it in such full, clear, concise, and exact terms as to enable any person skilled in the art to which it pertains, or with which it is most closely connected, to make and use the same, and having set forth the best modes for carrying out my invention.

I claim:

1. A single pass upflow dilute-phase process for chlorinating an oxidic metallic ore to form a metal chloride comprising:

(a) providing a chlorination reaction zone having an inlet end at the bottom of the chlorination reaction zone and an outlet end at the top of the chlorination reaction zone;

(b) introducing into the chlorination reaction zone through the inlet end an oxidic metallic ore having a mean diameter particle size of from about 1 to about 20 microns;

(c) introducing into the chlorination reaction zone through the inlet end a carbonaceous reductant material having a mean diameter particle size of from about 1 to about 20 microns in an amount sufficient to render the combined concentration of oxidic metallic ore and carbonaceous material in the inlet end of from 0.1 to 1.0 kg/m$^3$;

(d) introducing into the chlorination reaction zone through the inlet end a chlorine-providing material selected from the group consisting of chlorine gas, organochlorides and mixtures thereof;

(e) maintaining the temperature in the chlorination reaction zone in a range from about 800° C. to about 1500°;

(f) moving the oxidic metallic ore, the carbonaceous reductant and the chlorine providing material upwardly through the chlorination reaction zone while allowing the oxidic metallic ore, the carbonaceous reductant material, and the chlorine-providing material a sufficient dwell time in the chlorination reaction zone for chlorination to take place and to develop an off-gas product;

(g) removing the off-gas product from the outlet end of the chlorination reaction zone; and (h) recovering metal chlorides from the off-gas product.

2. A single pass upflow dilute-phase process of claim 1, wherein the oxidic metallic ore, carbonaceous reductant material and chlorine-providing material are moved upwardly through the chlorination reaction zone by controlling the flow rate of material being introduced to the chlorination reaction zone.

3. A process of claim 1, wherein the chlorination reaction zone is tubular.

4. A process of claim 1, wherein the temperature range is about 900° C. to about 1200° C.

5. A process of claim 4, wherein the temperature range is from about 1000° C. to about 1100° C.

* * * * *